US011407876B2

(12) United States Patent
Matsunobu et al.

(10) Patent No.: US 11,407,876 B2
(45) Date of Patent: *Aug. 9, 2022

(54) METHOD OF PRODUCING POROUS BODY OF ETHYLENE-VINYL ALCOHOL COPOLYMER

(71) Applicant: TOYOTA JIDOSHA KABUSHIKI KAISHA, Toyota (JP)

(72) Inventors: Kohei Matsunobu, Toyota (JP); Akio Minakuchi, Okazaki (JP); Hiroshi Uyama, Suita (JP); Chiaki Yoshizawa, Suita (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,753

(22) Filed: Aug. 25, 2020

(65) Prior Publication Data

US 2021/0061969 A1 Mar. 4, 2021

(30) Foreign Application Priority Data

Aug. 29, 2019 (JP) .............................. JP2019-156315

(51) Int. Cl.
*C08J 9/28* (2006.01)

(52) U.S. Cl.
CPC ......... *C08J 9/28* (2013.01); *C08J 2201/0502* (2013.01); *C08J 2329/04* (2013.01)

(58) Field of Classification Search
CPC .. C08J 9/28; C08J 2201/0502; C08J 2329/04; C08J 2331/04; C08J 2201/0504;
(Continued)

(56) References Cited

U.S. PATENT DOCUMENTS

| 3,450,650 A | 6/1969 | Murata |
| 5,409,785 A | 4/1995 | Nakano et al. |

(Continued)

FOREIGN PATENT DOCUMENTS

| EP | 3 786 222 A1 | 3/2021 |
| EP | 3786223 A1 | 3/2021 |

(Continued)

OTHER PUBLICATIONS

Sun et al., "Fabrication of a poly(vinyl alcohol) monolith via thermally impacted non-solvent-induced phase separation," Polymer Journal (2013), 45, 1101-1106. (Year: 2013).*

(Continued)

*Primary Examiner* — Kara B Boyle
(74) *Attorney, Agent, or Firm* — Sughrue Mion, PLLC

(57) ABSTRACT

Provided is a method of producing a porous body of an ethylene-vinyl alcohol copolymer, the method being excellent in terms of simplicity. The method of producing a porous body of an ethylene-vinyl alcohol copolymer disclosed here includes the steps of: preparing a solution in which an ethylene-vinyl alcohol copolymer is dissolved in a mixed solvent of water and propyl alcohol; and removing the mixed solvent from the solution by vaporization. A porous skeleton and pores are formed in the step of removing the mixed solvent by vaporization.

10 Claims, 1 Drawing Sheet

5μm

(58) Field of Classification Search
CPC ....... C08J 5/18; C08J 2323/08; C09D 129/04; C08L 23/0861
See application file for complete search history.

(56) References Cited

U.S. PATENT DOCUMENTS

| | | | |
|---|---|---|---|
| 5,863,645 A * | 1/1999 | Misoo | B01D 69/08 428/314.2 |
| 6,177,181 B1 | 1/2001 | Hamada et al. | |
| 6,287,730 B1 | 9/2001 | Callahan et al. | |
| 6,464,351 B1 | 10/2002 | Landry-Coltrain et al. | |
| 2003/0215624 A1 | 11/2003 | Layman et al. | |
| 2013/0058858 A1 | 3/2013 | Uyama et al. | |
| 2014/0311984 A1 | 10/2014 | Nakama et al. | |
| 2016/0104900 A1 | 4/2016 | Imashiro et al. | |
| 2018/0251627 A1 | 9/2018 | Schmitt | |
| 2019/0367699 A1 | 12/2019 | Minakuchi et al. | |

FOREIGN PATENT DOCUMENTS

| | | |
|---|---|---|
| EP | 3 805 298 A1 | 4/2021 |
| ER | 3 851 188 A1 | 7/2021 |
| FR | 3 041 352 A1 | 3/2017 |
| JP | 06-76838 A | 3/1994 |
| JP | 10-278417 A | 10/1998 |
| JP | 2000-296668 A | 10/2000 |
| JP | 2001-088432 A | 4/2001 |
| JP | 2001-270946 A | 10/2001 |
| JP | 2005-213315 A | 8/2005 |
| JP | 2006-306945 A | 11/2006 |
| JP | 2008-056905 A | 3/2008 |
| JP | 2011-165574 A | 8/2011 |
| JP | 2011-236292 A | 11/2011 |
| JP | 2014-234496 A | 12/2014 |
| JP | 2019-206667 A | 12/2019 |
| KR | 10-2006-0116323 A | 11/2006 |
| KR | 10-1872094 B1 | 7/2018 |
| WO | 2008/130705 A1 | 10/2008 |
| WO | 2011/138937 A1 | 11/2011 |
| WO | 2014/199880 A1 | 12/2014 |

OTHER PUBLICATIONS

Virginia Muriel-Galet et al., "Antimicrobial food packaging film based on the release of LAE from EVOH", International Journal of Food Microbiology, vol. 157, No. 2, May 5, 2012, pp. 239-244 (6 pages total).

Guowei Wang et al., "Mesoporous poly (ethylene-co-vinyl alcohol) monolith captured with silver nanoparticles as a SERS substrate: facile fabrication and ultra-high sensitivity", RSC ADVANCES, vol. 5, No. 33, Jan. 1, 2015, pp. 25777-25780 (4 pages total).

Guowei Wang, "Fabrication of Poly(ethylene-co-vinyl alcohol) Monoliths via Thermally Induced Phase Separation and Their Applications", Jul. 31, 2015 (Jul. 31, 2015), XP055761556, DOI: 10.18910/54010 (81 pages total).

Bai et al., "Hierarchical porous cellulose/activated carbon composite monolith for efficient adsorption of dyes", Cellulose, vol. 24, No. 10, pp. 4275-4289, Jul. 2017 (15 pages total).

Tai-Homg Young et al.,"Preparation of EVAL membranes with smooth and particulate morphologies for neuronal culture", Biomaterials, 2001, vol. 22, pp. 1771-1777 (7 pages).

U.S. Appl. No. 16/998,664, filed Aug. 20, 2020.

Sun Zheng et al., "The role of pre-evaporation in the preparation process of EVOH ultrafiltration membrane via TIPS, Journal of Membrane Science", vol. 563, pp. 238-246, Jun. 4, 2018 (9 total pages).

Guowei Wang et al., "Reactive poly(ethylene-co-vinyl alcohol) monoliths with tunable pore morphology for enzyme immobilization", Springer, Colloid Polym Sci., Jun. 4, 2015, pp. 2429-2435, vol. 293, No. 8.

* cited by examiner

5μm

5μm

METHOD OF PRODUCING POROUS BODY OF ETHYLENE-VINYL ALCOHOL COPOLYMER

BACKGROUND OF THE INVENTION

1. Field of the Invention

The present disclosure relates to a method of producing a porous body of an ethylene-vinyl alcohol copolymer. The present application claims priority to Japanese Patent Application No. 2019-156315 filed on Aug. 29, 2019, the entire contents of which are incorporated into the present specification by reference.

2. Description of the Related Art

Porous bodies of water-insoluble polymers can exhibit a variety of characteristics, such as lightness, shock-absorbing properties, thermal insulation properties, sound absorption properties, separation properties and adsorption properties. Therefore, porous bodies of water-insoluble polymers have been used in a wide variety of applications, such as packing materials, construction materials, sound-absorbing materials, cleaning articles, cosmetic products, separation membranes, adsorbent materials, carriers for purification, catalyst carriers and culture carriers.

From perspectives such as production costs, it is desired for a method of producing a porous body of a water-insoluble polymer to be simple. One example of a water-insoluble polymer is an ethylene-vinyl alcohol copolymer. As a method capable of producing a porous body of an ethylene-vinyl alcohol copolymer in a simple manner, Japanese Patent Application Publication No. 2014-234496 discloses a method of producing a porous body of an ethylene-vinyl alcohol copolymer, the method including adding water and a first solvent that is miscible with water to an ethylene-vinyl alcohol copolymer while heating so as to obtain a solution of the ethylene-vinyl alcohol copolymer, cooling the solution of the ethylene-vinyl alcohol copolymer so as to obtain a precipitated molded body, and immersing the molded body in a second solvent so as to replace the water and/or first solvent contained in the molded body with the second solvent and obtain a porous body that contains the ethylene-vinyl alcohol copolymer as a primary component.

SUMMARY OF THE INVENTION

As a result of diligent research, the inventors of the present disclosure have found that the production method of the prior art had further room for improvement in terms of producing a porous body in a simple manner.

Therefore, an object of the present disclosure is to provide a method of producing a porous body of an ethylene-vinyl alcohol copolymer, the method being excellent in terms of simplicity.

A method of producing a porous body of an ethylene-vinyl alcohol copolymer disclosed here includes the steps of: preparing a solution in which an ethylene-vinyl alcohol copolymer is dissolved in a mixed solvent of water and propyl alcohol; and removing the mixed solvent from the solution by vaporization. A porous skeleton and pores are formed in the step of removing the mixed solvent by vaporization.

According to such a constitution, it is possible to produce a porous body of an ethylene-vinyl alcohol copolymer using a simple process, namely preparing a solution of an ethylene-vinyl alcohol copolymer and then vaporizing a mixed solvent. That is to say, provided by such a constitution is a method of producing a porous body of an ethylene-vinyl alcohol copolymer, the method being excellent in terms of simplicity.

DESCRIPTION OF THE PREFERRED EMBODIMENTS

Figure 1:
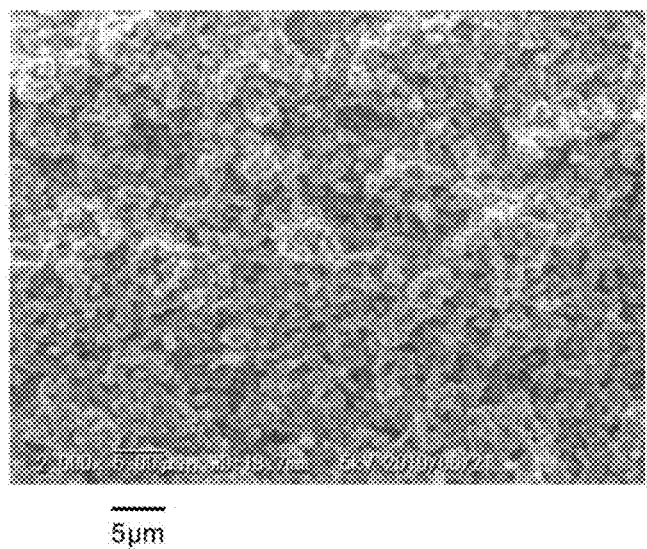
FIG. 1 is a SEM photograph of a cross section of a thin film obtained in Example 2.

A method of producing a porous body of a water-soluble polymer of the present disclosure includes the steps of: preparing a solution in which an ethylene-vinyl alcohol copolymer is dissolved in a mixed solvent of water and propyl alcohol (hereinafter referred to as a "solution preparation step"); and removing the mixed solvent from the solution by vaporization (hereinafter referred to as a "mixed solvent removal step"). A porous skeleton and pores are formed in the step of removing the mixed solvent by vaporization.

The "ethylene-vinyl alcohol copolymer" used in the present disclosure means a copolymer containing ethylene units and vinyl alcohol units as monomer units.

The content of ethylene units in the ethylene-vinyl alcohol copolymer is not particularly limited, but is desirably 10 mol % or more, more desirably 15 mol % or more, further desirably 20 mol % or more, and particularly desirably 25 mol % or more. On the other hand, the content of ethylene units in the ethylene-vinyl alcohol copolymer is desirably 60 mol % or less, more desirably 50 mol % or less, and further desirably 45 mol % or less. It should be noted that the content of ethylene units in the ethylene-vinyl alcohol copolymer can be determined using a publicly known method (for example, $^1$H-NMR measurements or the like).

The degree of saponification of the ethylene-vinyl alcohol copolymer is not particularly limited, but is desirably 80 mol % or more, more desirably 90 mol % or more, and further desirably 95 mol % or more. The upper limit for the degree of saponification is determined by technical limitations relating to saponification and is, for example, 99.99 mol %. It should be noted that the degree of saponification in the ethylene-vinyl alcohol copolymer can be determined using a publicly known method (for example, $^1$H-NMR measurements or the like).

The viscosity average degree of polymerization of the ethylene-vinyl alcohol copolymer is not particularly limited, but is desirably not less than 70 but not more than 500,000, or desirably not less than 100 but not more than 200,000, further desirably not less than 200 but not more than 30,000, and particularly desirably not less than 500 but not more than 15,000. It should be noted that the viscosity average degree of polymerization of the ethylene-vinyl alcohol copolymer can be determined from the viscosity of a solution at 30° C. using, for example, dimethyl sulfoxide as a solvent.

In addition, ethylene-vinyl alcohol copolymers are generally produced by saponifying copolymers of ethylene and vinyl esters using an alkali catalyst or the like. As a result, ethylene-vinyl alcohol copolymers can contain vinyl ester units. Vinyl esters in such units are typically vinyl acetate, and may also be vinyl formate, vinyl propionate, vinyl valerate, vinyl caprate, vinyl laurate, and the like.

In addition to ethylene units, vinyl alcohol units and vinyl ester units, the ethylene-vinyl alcohol copolymer may also contain other monomer units (for example, propylene units, butylene units, (meth)acrylic acid units, (meth)acrylic acid ester units, vinyl ether units, acrylamide units, unsaturated dicarboxylic acid units, halogenated vinyl units, and the like) as long as the advantageous effect of the present disclosure is not significantly impaired.

The ethylene-vinyl alcohol copolymer is insoluble in water and in propyl alcohol, but has the property of being soluble in a mixed solvent of water and propyl alcohol.

The type of water used in the present disclosure is not particularly limited, but is desirably ion exchanged water, ultrafiltered water, reverse osmosis water, distilled water or ultrapure water, and more desirably ion exchange water, from the perspective of preventing contamination by impurities.

Propyl alcohol includes two structural isomers, namely n-propyl alcohol (in other words, 1-propanol) and isopropyl alcohol (in other words, 2-propanol). In the present disclosure, both n-propyl alcohol and isopropyl alcohol can be used as the propyl alcohol.

In cases where the propyl alcohol is n-propyl alcohol, the volume ratio (water/n-propyl alcohol) of water and n-propyl alcohol in the mixed solvent is desirably 50/50 to 20/80 from the perspective of being able to easily prepare a solution of the ethylene-vinyl alcohol copolymer.

In cases where the propyl alcohol is isopropyl alcohol, the volume ratio (water/isopropyl alcohol) of water and isopropyl alcohol in the mixed solvent is desirably 50/50 to 30/70 from the perspective of being able to easily prepare a solution of the ethylene-vinyl alcohol copolymer.

The mixing amount of the ethylene-vinyl alcohol copolymer is desirably 1 part by mass or more, more desirably 5 parts by mass or more, and further desirably 10 parts by mass or more, relative to 100 parts by mass of the mixed solvent. On the other hand, the mixing amount of the ethylene-vinyl alcohol copolymer is desirably 40 parts by mass or less, more desirably 35 parts by mass or less, and further desirably 30 parts by mass or less, relative to 100 parts by mass of the mixed solvent.

By altering the volume ratio of water and propyl alcohol in the mixed solvent and altering the mixing amounts of the mixed solvent and the ethylene-vinyl alcohol copolymer, it is possible to control the state of pores (for example, porosity, pore diameter, and the like) in an obtained porous body.

The solution of the ethylene-vinyl alcohol copolymer may further contain components other than the ethylene-vinyl alcohol copolymer, water and propyl alcohol as long as the advantageous effect of the present disclosure is not significantly impaired.

The method of preparing the solution of the ethylene-vinyl alcohol copolymer is not particularly limited. An example of a preparation method is a method including mixing a mixed solvent of water and propyl alcohol with an ethylene-vinyl alcohol copolymer using a publicly known stirring device, mixing device, or the like. When preparing the solution of the ethylene-vinyl alcohol copolymer, it is possible to irradiate with ultrasonic waves, carry out heating, and the like. The heating temperature is, for example, not lower than 40° C. and not higher than the reflux temperature. Cooling may be carried out after the heating. This cooling is desirably carried out in such a way that the ethylene-vinyl alcohol copolymer does not precipitate. This is because precipitated ethylene-vinyl alcohol copolymer can be an impurity.

Next, an explanation will be given of the mixed solvent removal step. In the mixed solvent removal step, the water and propyl alcohol are removed through vaporization (particularly, volatilization). At this time, a porous skeleton and pores are formed by this operation, and a porous body of the ethylene-vinyl alcohol copolymer is obtained. Specifically, the porous skeleton and pores are formed in the following way. Because propyl alcohol has a lower boiling point and higher volatility than water, the propyl alcohol is preferentially vaporized ahead of the water in this step. When the amount of propyl alcohol decreases, the proportion of water in the mixed solvent increases. When the proportion of water in the mixed solvent is excessively high, it becomes impossible to dissolve the ethylene-vinyl alcohol copolymer. Therefore, phase separation can occur in a mixed solvent that cannot dissolve the ethylene-vinyl alcohol copolymer. Therefore, by utilizing this phase separation, it is possible to form a porous skeleton of the ethylene-vinyl alcohol copolymer. This phase separation may be spinodal decomposition. Pores are finally formed through complete removal of the mixed solvent through vaporization. Therefore, a porous skeleton and pores are formed in this step, and a porous body of the ethylene-vinyl alcohol copolymer is produced in this mixed solvent removal step.

The method for vaporizing the mixed solvent is not particularly limited, and examples thereof include methods involving heating, methods involving leaving in a vacuum, methods involving heating under reduced pressure and methods involving air drying. These methods can be carried out in the same way as publicly known drying methods. From the perspective of ease of carrying out the procedure, a method involving heating is desired. The heating temperature is not particularly limited, but is desirably a temperature at which the mixed solvent does not boil and the ethylene-vinyl alcohol copolymer does not decompose. Specifically, the heating temperature is, for example, 25° C. or higher, desirably 50° C. or higher, and more desirably 70° C. or higher. On the other hand, the heating temperature is, for example, lower than the boiling point of the mixed solvent, desirably 90° C. or lower, and more desirably 85° C. or lower. The heating time should be decided, as appropriate, according to the heating temperature. While vaporizing the mixed solvent, it is desirable to leave the solution of the ethylene-vinyl alcohol copolymer to stand.

In cases where a porous body having a prescribed shape is to be obtained, it is possible to place the solution of the ethylene-vinyl alcohol copolymer in a container having a shape corresponding to the prescribed shape and then use an appropriate heating method. In cases where a film-shaped porous body is to be obtained, it is possible to coat the solution of the ethylene-vinyl alcohol copolymer in a form of a thin film on a surface of a substrate and then use an appropriate heating method.

It is possible to obtain a porous body of the ethylene-vinyl alcohol copolymer in the manner described above. The thus produced porous body can have a three-dimensional network-shaped porous structure. In the case of a thin film-shaped porous body in particular, the porous body can have a three-dimensional network-shaped porous structure in which pores are connected from one main surface of the thin film-shaped porous body to the other main surface. According to the production method of the present disclosure, it is possible to obtain a porous body having an average pore diameter of, for example, 0.5 μm or more (and particularly 0.9 μm or more or even 1.4 μm or more) and 5 μm or less (and particularly 4.2 μm or less or even 3.8 μm or less). It should be noted that the average pore diameter can be determined by taking an electron microscope photograph of a cross section of the porous body and determining the average pore diameter as the average value of the diameters of 100 or more pores. In cases where the cross section of a pore is aspherical, the average value of the maximum diameter and minimum diameter of the pore may be taken to be the pore diameter. In addition, according to the production method of the present disclosure, it is possible to obtain a porous body having a porosity of, for example, 30% or more (and particularly 35% or more) and 70% or less (and particularly 65% or less). It should be noted that the porosity can be calculated in accordance with a publicly known method using the true density and the apparent density.

Obtained porous bodies of ethylene-vinyl alcohol copolymers can be used in a variety of applications, depending on the type of ethylene-vinyl alcohol copolymer. Examples of applications include packing materials, construction materials, sound-absorbing materials, cleaning articles, cosmetic products, separation membranes, adsorbent materials, carriers for purification, catalyst carriers and culture carriers.

According to the present disclosure, it is possible to produce a porous body of an ethylene-vinyl alcohol copolymer using a simple process, namely preparing a solution of an ethylene-vinyl alcohol copolymer and then vaporizing water and propyl alcohol. In the present disclosure, it is not necessary to carry out a procedure of cooling so as to precipitate a molded body or a procedure of replacing a solvent, which was necessary in the prior art. Therefore, the method of producing a porous body of an ethylene-vinyl alcohol copolymer of the present disclosure is excellent in terms of simplicity.

EXAMPLES

Explanations will now be given of examples relating to the present disclosure, but it is not intended that the present disclosure is limited to these examples.

Example 1

Into a sample bottle, 1 g of an ethylene-vinyl alcohol copolymer ("Eval L171B" available from Kuraray Co., Ltd.; ethylene content 27 mol %, hereinafter abbreviated to "EVOH") was weighed out. To this was added 5 mL of a mixed solvent containing 2.5 mL of water and 2.5 mL of n-propyl alcohol (nPA). The sample bottle was heated to 80° C. to 90° C. and stirred until the EVOH completely dissolved in the mixed solvent, thereby obtaining an EVOH solution. The EVOH solution was then cooled to 25° C. The EVOH solution was then coated on an aluminum sheet by casting. The coating thickness was approximately 200 µm. This was then placed in a drier set to 80° C. and heated, thereby removing the mixed solvent through vaporization. A thin film was obtained on the aluminum sheet in this way. A cross section of the obtained thin film was observed using a scanning electron microscope (SEM), and thereby it was confirmed that the thin film was a porous body.

Examples 2 to 4

Thin films were obtained using the same procedure as that used in Example 1, except that a mixed solvent containing water and n-propyl alcohol (nPA) at amounts shown in Table 1 was used. A cross section of each obtained thin film was observed using a SEM, and thereby it was confirmed that the thin film was a porous body. For reference purposes, a SEM photograph of a cross section of the thin film obtained in Example 2 is shown in FIG. 1.

Comparative Example 1

Into a sample bottle, 1 g of EVOH was weighed out. To this was added 5 mL of water. The sample bottle was heated to 80° C. to 90° C. and stirred for 2 hours. However, the EVOH did not dissolve and an EVOH solution could not be obtained.

Comparative Examples 2 to 4 and Comparative Example 6

Into a sample bottle, 1 g of EVOH was weighed out. To this was added a mixed solvent containing water and n-propyl alcohol (nPA) at amounts shown in Table 1. The sample bottle was heated to 80° C. to 90° C. and stirred for 2 hours. However, the EVOH did not dissolve and an EVOH solution could not be obtained.

Comparative Example 5

A thin film was obtained using the same procedure as that used in Example 1, except that a mixed solvent containing water and n-propyl alcohol (nPA) at amounts shown in Table 1 was used. A cross section of the obtained thin film was observed using a SEM, and thereby it was confirmed that the thin film was not porous.

Comparative Example 7

Into a sample bottle, 1 g of EVOH was weighed out. To this was added 5 mL of n-propyl alcohol (nPA). The sample bottle was heated to 80° C. to 90° C. and stirred for 2 hours. However, the EVOH did not dissolve and an EVOH solution could not be obtained.

Examples 5 to 7

Figure 2:
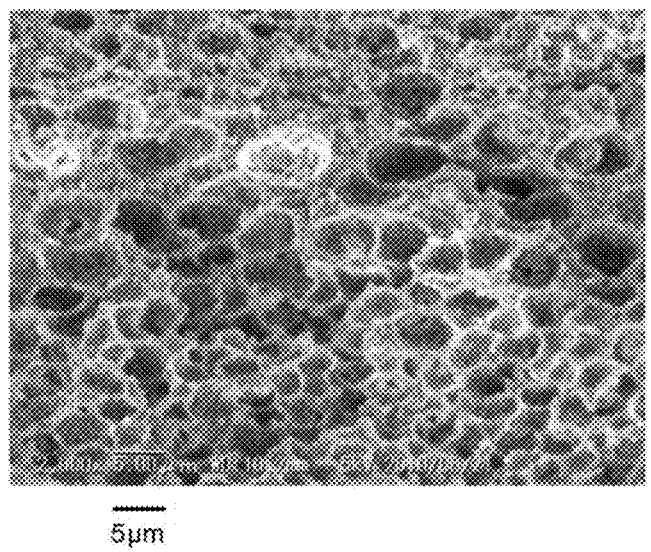
FIG. 2 is a SEM photograph of a cross section of a thin film obtained in Example 7.

Thin films were obtained using the same procedure as that used in Example 1, except that a mixed solvent containing water and isopropyl alcohol (iPA) at amounts shown in Table 2 was used. A cross section of each obtained thin film was observed using a SEM, and thereby it was confirmed that the thin film was a porous body. For reference purposes, a SEM photograph of a cross section of the thin film obtained in Example 7 is shown in FIG. 2.

Comparative Examples 8 to 13

Into a sample bottle, 1 g of EVOH was weighed out. To this was added a mixed solvent containing water and isopropyl alcohol (iPA) at amounts shown in Table 2. The sample bottle was heated to 80° C. to 90° C. and stirred for 2 hours. However, the EVOH did not dissolve and an EVOH solution could not be obtained.

Measurement of Porosity

Samples were prepared by punching out the thin films obtained in the examples to prescribed sizes. The weights and film thicknesses of these samples were determined. From the area and film thickness of a sample, the volume of the sample was determined and the apparent density was calculated. Using the true density of the ethylene-vinyl alcohol copolymer that constitutes the thin film, the porosity was calculated using the formula below. The results are shown in Table 1 and Table 2.

$$\text{Porosity}(\%) = (1 - \text{apparent density}/\text{true density}) \times 100$$

From the results in Table 1 and Table 2, it can be confirmed that a porous body of an ethylene-vinyl alcohol copolymer can be produced using the method of the present disclosure.

TABLE 1

| | EVOH (g) | Water (mL) | nPA (mL) | Volume ratio water/nPA | Solution preparation possible? | State of thin film | Porosity (%) |
|---|---|---|---|---|---|---|---|
| Comparative Example 1 | 1 | 5 | 0 | 100/0 | No | — | — |
| Comparative Example 2 | 1 | 4.5 | 0.5 | 90/10 | No | — | — |
| Comparative Example 3 | 1 | 4 | 1 | 80/20 | No | — | — |
| Comparative Example 4 | 1 | 3.5 | 1.5 | 70/30 | No | — | — |
| Comparative Example 5 | 1 | 3 | 2 | 60/40 | Yes | Non-porous | — |
| Example 1 | 1 | 2.5 | 2.5 | 50/50 | Yes | Porous | 36.2 |
| Example 2 | 1 | 2 | 3 | 40/60 | Yes | Porous | 42.8 |
| Example 3 | 1 | 1.5 | 3.5 | 30/70 | Yes | Porous | 57.9 |
| Example 4 | 1 | 1 | 4 | 20/80 | Yes | Porous | 62.9 |
| Comparative Example 6 | 1 | 0.5 | 4.5 | 10/90 | No | — | — |
| Comparative Example 7 | 1 | 0 | 5 | 0/100 | No | — | — |

TABLE 2

| | EVOH (g) | Water (mL) | iPA (mL) | Volume ratio water/iPA | Solution preparation possible? | State of thin film | Porosity (%) |
|---|---|---|---|---|---|---|---|
| Comparative Example 8 | 1 | 4.5 | 0.5 | 90/10 | No | — | — |
| Comparative Example 9 | 1 | 4 | 1 | 80/20 | No | — | — |
| Comparative Example 10 | 1 | 3.5 | 1.5 | 70/30 | No | — | — |
| Comparative Example 11 | 1 | 3 | 2 | 60/40 | No | — | — |
| Example 5 | 1 | 2.5 | 2.5 | 50/50 | Yes | Porous | 41.4 |
| Example 6 | 1 | 2 | 3 | 40/60 | Yes | Porous | 40.5 |
| Example 7 | 1 | 1.5 | 3.5 | 30/70 | Yes | Porous | 49.6 |
| Comparative Example 12 | 1 | 1 | 4 | 20/80 | No | — | — |
| Comparative Example 13 | 1 | 0.5 | 4.5 | 10/90 | No | — | — |

What is claimed is:

1. A method of producing a porous body of an ethylene-vinyl alcohol copolymer, the method comprising the steps of:
preparing a solution in which an ethylene-vinyl alcohol copolymer is dissolved in a mixed solvent of water and propyl alcohol, wherein the step of preparing the solution includes heating the solution to obtain a heated solution, followed by cooling the heated solution to obtain a cooled solution;
coating the cooled solution in a form of a thin film on a surface of a substrate; and
removing the mixed solvent from the solution on the surface of the substrate by vaporization,
wherein a porous skeleton and pores are formed in the step of removing the mixed solvent by vaporization.

2. The method of producing a porous body of an ethylene-vinyl alcohol copolymer according to claim 1, wherein the propyl alcohol is n-propyl alcohol and a volume ratio (water/n-propyl alcohol) of water and n-propyl alcohol in the mixed solvent is 50/50 to 20/80.

3. The method of producing a porous body of an ethylene-vinyl alcohol copolymer according to claim 1, wherein the propyl alcohol is isopropyl alcohol and a volume ratio (water/isopropyl alcohol) of water and isopropyl alcohol in the mixed solvent is 50/50 to 30/70.

4. The method of producing a porous body of an ethylene-vinyl alcohol copolymer according to claim 1, wherein, in the step of preparing the solution, the heating temperature is not lower than 40° C. and not higher than a reflux temperature of the solution.

5. A method of producing a porous body of an ethylene-vinyl alcohol copolymer, the method comprising the steps of:
preparing a solution in which an ethylene-vinyl alcohol copolymer is dissolved in a mixed solvent of water and propyl alcohol, wherein the step of preparing the solution includes heating the solution to obtain a heated solution, followed by cooling the heated solution to obtain a cooled solution; and
removing the mixed solvent from the solution by vaporization,
wherein a porous skeleton and pores are formed in the step of removing the mixed solvent by vaporization; and
wherein, in the step of preparing the solution, the ethylene-vinyl alcohol copolymer does not precipitate during the cooling.

6. The method of producing a porous body of an ethylene-vinyl alcohol copolymer according to claim 1, wherein the average diameter of the pores is 1.4 µm or more and 5 µm or less.

7. The method of producing a porous body of an ethylene-vinyl alcohol copolymer according to claim 5, wherein the propyl alcohol is n-propyl alcohol and a volume ratio (water/n-propyl alcohol) of water and n-propyl alcohol in the mixed solvent is 50/50 to 20/80.

8. The method of producing a porous body of an ethylene-vinyl alcohol copolymer according to claim 5, wherein the propyl alcohol is isopropyl alcohol and a volume ratio (water/isopropyl alcohol) of water and isopropyl alcohol in the mixed solvent is 50/50 to 30/70.

9. The method of producing a porous body of an ethylene-vinyl alcohol copolymer according to claim 5, wherein, in the step of preparing the solution, the heating temperature is not lower than 40° C. and not higher than a reflux temperature of the solution.

10. The method of producing a porous body of an ethylene-vinyl alcohol copolymer according to claim 5, wherein the average diameter of the pores is 1.4 μm or more and 5 μm or less.

* * * * *